(12) United States Patent
Ulemek et al.

(10) Patent No.: US 9,738,012 B2
(45) Date of Patent: Aug. 22, 2017

(54) MOLD COMPONENT

(71) Applicant: Husky Injection Molding Systems Ltd., Bolton (CA)

(72) Inventors: Adam Christopher Ulemek, Mississauga (CA); Maxfield Paul Bradshaw, Oakville (CA); Sami Samuel Arsan, Mississauga (CA); Renato Papa, Scarborough (CA); Daniel Joseph Osmokrovic, Toronto (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 40 days.

(21) Appl. No.: 14/917,070

(22) PCT Filed: Aug. 15, 2014

(86) PCT No.: PCT/CA2014/050785
§ 371 (c)(1),
(2) Date: Mar. 7, 2016

(87) PCT Pub. No.: WO2015/039224
PCT Pub. Date: Mar. 26, 2015

(65) Prior Publication Data
US 2016/0214280 A1  Jul. 28, 2016

Related U.S. Application Data

(60) Provisional application No. 61/880,444, filed on Sep. 20, 2013.

(51) Int. Cl.
*B29C 33/04* (2006.01)
*B29C 45/73* (2006.01)
*B29C 33/76* (2006.01)
*B22F 3/105* (2006.01)
*B22F 5/00* (2006.01)
(Continued)

(52) U.S. Cl.
CPC .......... *B29C 33/04* (2013.01); *B22F 3/1055* (2013.01); *B22F 5/007* (2013.01);
(Continued)

(58) Field of Classification Search
CPC .. B29C 33/04; B29C 33/3842; B29C 45/7312
See application file for complete search history.

(56) References Cited

U.S. PATENT DOCUMENTS 5,849,238 A  12/1998  Schmidt et al.

FOREIGN PATENT DOCUMENTS

WO  2010099450 A2  9/2010

OTHER PUBLICATIONS

"Conformal Cooling Using DMLS", Whitepaper GPI Prototype & Manufacturing Services, Inc., Mar. 2012, retrieved the World Wide Web at: http://beta.rodpub.com/public/uploads/365258Conformal040212final.pdf.
(Continued)

*Primary Examiner* — James Sanders

(57) ABSTRACT

There is provided a member of a mold stack (100, 800), the member comprising: a member body (102, 802) defining a member molding surface for defining, in use, a portion of a molding cavity for molding a molded article, a member cooling circuit (120, 820) having a plurality of member cooling channels (128, 829), the plurality of member cooling channels (128, 829) being coupled in parallel to a source of cooling fluid, the member cooling circuit (120, 820) being fully encapsulated within the member body (102, 802).

6 Claims, 8 Drawing Sheets

(51) Int. Cl.
    *B29C 33/38*     (2006.01)
    *B29C 45/26*     (2006.01)
    *B33Y 10/00*     (2015.01)
    *B33Y 80/00*     (2015.01)
    *B29K 67/00*     (2006.01)
    *B29L 31/00*     (2006.01)
    *B29K 105/00*     (2006.01)

(52) U.S. Cl.
    CPC .......... *B29C 33/3842* (2013.01); *B29C 33/76* (2013.01); *B29C 45/2622* (2013.01); *B29C 45/7312* (2013.01); *B29C 2033/042* (2013.01); *B29K 2067/003* (2013.01); *B29K 2105/258* (2013.01); *B29L 2031/7158* (2013.01); *B33Y 10/00* (2014.12); *B33Y 80/00* (2014.12)

(56) References Cited

OTHER PUBLICATIONS

"Tooling Applications with EOSINT M.", Shellabear, Mike & Weihammer, Joseph, Krailling, EOS Whitepaper, Sep. 2007 retrieved from the World Wide Web at http://www.3dimpuls.com/sites/default/files/download/tooling_applications_with_eosint_m280.pdf.
"Production of Injection Molding Tooling with Conformal Cooling Channels using the Three Dimensional Printing Process", Sachs et al., Massachusetts Institute of Technology, 1995, retrieved from the World Wide Web at: http://utwired.engr.utexas.edu/1ff/symposium/proceedingsArchive/pubs/Manuscripts/1995/1195-56-Sachs.pdf.
International Search Report, Cuerrier, Pierre, 6 pages, dated Oct. 1, 2014.

MOLD COMPONENT

TECHNICAL FIELD

Non-Limiting embodiments disclosed herein generally relate to, but is not limited to, molding systems, and more specifically to mold components for use in molding systems.

BACKGROUND

Molding is a process by virtue of which a molded article can be formed from molding material by using a molding system. Various molded articles can be formed by using the molding process, such as an injection molding process. One example of a molded article that can be formed, for example, from Polyethylene terephthalate (PET) material is a preform that is capable of being subsequently blown into a beverage container, such as, a bottle and the like.

As an illustration, injection molding of PET material involves heating the molding material (ex. PET pellets, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be de-molded, i.e. ejected off of the core piece. Ejection structures are known to assist in removing the molded articles from the core halves. Examples of the ejection structures include stripper plates, ejector pins, etc.

SUMMARY

According to a first broad aspect of the present technology, there is provided a core insert. The core insert comprises a core insert body defining: a core insert molding surface for defining, in a use, a portion of a molding cavity for molding a molded article; a core insert cooling circuit having a plurality of core insert cooling channels, the plurality of core insert cooling channels comprising spiral channels coupled in parallel to a source of cooling fluid.

According to a second broad aspect of the present technology, there is provided a neck ring. The neck ring comprises a neck ring body defining: a neck ring molding surface for defining, in a use, a portion of a molding cavity for molding a molded article; a neck ring cooling circuit connected, in use, to a source of a cooling fluid via a neck ring cooling inlet and a neck ring cooling outlet, the neck ring cooling circuit having: a plurality of branch channels that are connected in parallel to the neck ring cooling inlet and the neck ring cooling outlet and at least one of the branch channels including multiple channel segments connected in parallel therein.

According to a third broad aspect of the present technology, there is provided a cavity insert. The cavity insert comprises a cavity insert body defining: a cavity insert molding surface for defining, in a use, a portion of a molding cavity for molding a molded article; a cavity insert cooling circuit having a plurality of cavity insert cooling channels, the plurality of cavity insert cooling channels being coupled in parallel to a source of cooling fluid.

According to a fourth broad aspect of the present technology, there is provided a gate insert. The gate insert comprises a gate insert body defining: a gate insert molding surface for defining, in a use, a portion of a molding cavity for molding a molded article; a nozzle receptacle configured to interface, in use, with a hot runner nozzle; a gate configured to provide a path of travel for a molding material between the hot runner nozzle and the molding cavity; a gate insert cooling circuit having a plurality of gate insert cooling channels, the plurality of gate insert cooling channels defined by a network of gate cooling channel supports within the gate body.

According to another broad aspect of the present technology, there is provided a member of a mold stack. The member comprises: a member body defining: a member molding surface for defining, in a use, a portion of a molding cavity for molding a molded article; a member connecting interface for coupling, in use, the member body to a mold plate; a member cooling circuit having a plurality of member cooling channels, the plurality of member cooling channels being coupled in parallel to a source of cooling fluid, the member cooling circuit being fully encapsulated within the member body.

According to yet another broad aspect of the present technology, there is provided a mold insert stack. The mold stack insert comprises at least two of a conformal cooling core insert, a conformal cooling neck ring insert, a conformal cooling cavity insert and a conformal cooling gate insert.

According to yet another broad aspect of the present technology, there is provided a method of manufacturing a mold stack component using a hybrid manufacturing method. The hybrid manufacturing method comprises manufacturing a portion of the mold stack component using a non-DMLS process; manufacturing another portion of the mold stack component using DMLS process.

These and other aspects and features of non-limiting embodiments will now become apparent to those skilled in the art upon review of the following description of specific non-limiting embodiments in conjunction with the accompanying drawings.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of mold components for use in a molding system and related methods for the production thereof. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
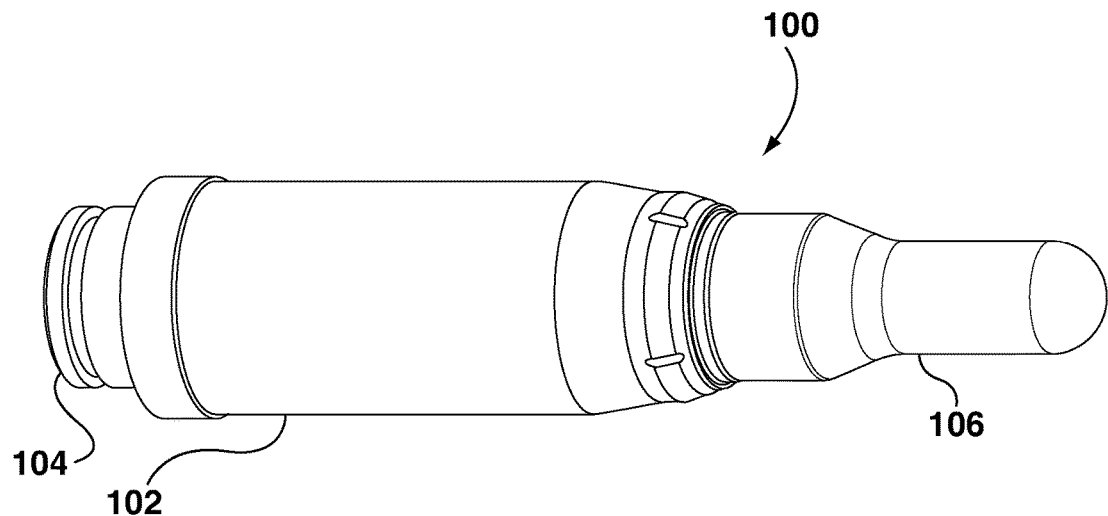
FIG. 1 depicts a perspective view of a core insert, the core insert being implemented in accordance with a non-limiting embodiment of the present technology.

With reference to FIG. 1, there is depicted a core insert 100 for use in an injection mold (not shown), the core insert 100 being implemented in accordance with a non-limiting embodiment of the present technology. The general purpose of the core insert 100 is to define, in use, a portion of a molding cavity (not depicted) that is used to define a molded article (not depicted), which in this case comprises a preform, which preform is subsequently blow molded into a final shaped container (such as a beverage bottle or the like). The general construction of the core insert 100 is known to those of skill in the art and, as such, only a very brief description of the generally known features will be presented herein, while the main focus of the description to be presented herein below will be on the specific features of embodiments of the present technology.

To that end, the core insert 100 comprises a core insert body 102. The core insert body 102 defines a connector 104, the connector 104 for coupling, in use, the core insert body 102 to a core plate of a mold (not depicted). The core insert 100 further comprises a core insert molding surface 106. The core insert molding surface 106, in this example, defines an inner skin of the molded article (not depicted) to be molded. The core insert molding surface 106 is shaped in an inverse relationship to the shape of the molded article (not depicted) to be molded—in other words, the core insert molding surface 106 is the male image of the female image to be defined on the molded article (not depicted) to be molded.

It can be said that the core insert 100 plays at least two functions during the appropriate portions of the molding cycle. On the one hand, the core insert 100 defines a portion of the shape of the molded article, as has been described above. Another function is to assist in cooling of the molded article. As is known to those skilled in the art, once the molding material is injected into the molding cavity, it needs to be cooled in order to solidify to a state where it can be safely removed from the molding cavity. To that end and with reference to FIG. 2, the core insert 100 comprises a core insert cooling circuit 120. The core insert cooling circuit 120 is connected, in use, to a source of a cooling fluid (not depicted) via a cooling coupling 122 defined in the connector 104. Typically, water is used as a cooling fluid, but this does not need to be so in every implementation of the present technology.

Figure 2:
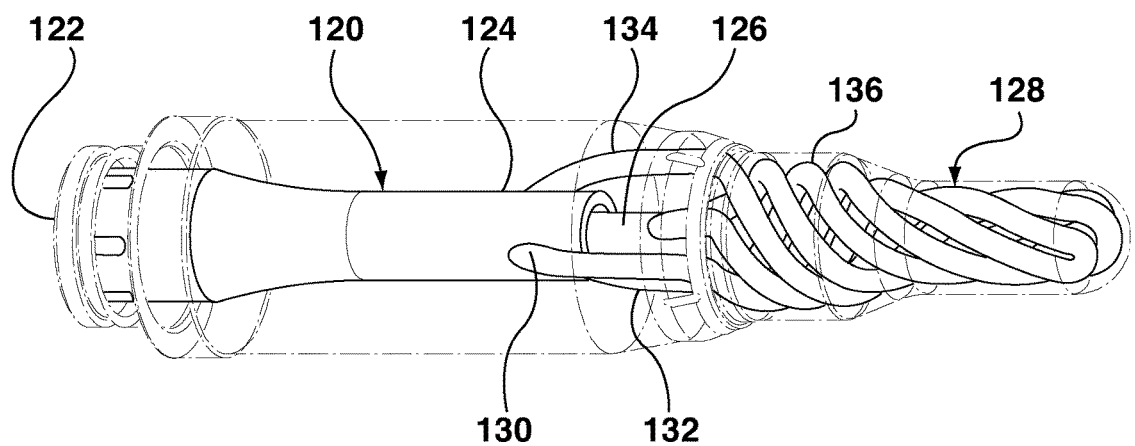
FIG. 2 depicts a partially transparent view of the core insert of FIG. 1.

According to embodiments of the present technology, the core insert cooling circuit 120 comprises an inlet portion 124 and an outlet portion 126. The inlet portion 124 is for receiving fresh cooling fluid and the outlet portion 126 is for allowing cooling fluid that has absorbed heat from the molded article to be evacuated. As can be seen in FIG. 2, the outlet portion 126 is disposed physically within the inlet portion 124. In the specific embodiment depicted herein, the outlet portion 126 is located coaxially within the inlet portion 124. In various alternative non-limiting embodiments of the present technology, the function of the outlet portion 126 and the inlet portion 124 can be reversed. In other words, the direction of the flow of the cooling fluid is not particularly limited and can flow either way within the core insert cooling circuit 120.

The core insert cooling circuit 120 further comprises a plurality of core insert cooling channels 128. Generally speaking, the core insert cooling circuit 120 has a general shape that follows the contours of the core insert molding surface 106. As such, it can be said that the core insert cooling circuit 120 is implemented as a "conformal cooling" channel, in a sense that it "conforms" to the shape of the core insert molding surface 106.

Within the specific embodiment being depicted the plurality of core insert cooling channels 128 comprises three cooling lines: a first core insert cooling channel 130, a second core insert cooling channel 132 and a third core insert cooling channel 134.

It should be expressly understood that the exact number of the cooling channels 130, 132, 134 within the plurality of core insert cooling channels 128 is not particularly limited. As such, in alternative non-limiting embodiments of the present technology, the plurality of core insert cooling channels 128 may comprise two lines. In other non-limiting embodiments, the plurality of core insert cooling channels 128 may comprise two or more cooling lines.

Each of the first core insert cooling channel 130, the second core insert cooling channel 132 and the third core insert cooling channel 134 originate from the inlet portion 124. In the specific non-limiting embodiment depicted in FIG. 2, the first core insert cooling channel 130, the second core insert cooling channel 132 and the third core insert cooling channel 134 are coupled to the inlet portion 124 in a spaced manner. The first core insert cooling channel 130, the second core insert cooling channel 132 and the third core insert cooling channel 134 are circumferentially spaced around the inlet portion 124 and are spaced apart by approximately 120 degrees, as an example implementation depicted in FIG. 2. It should be understood that in alternative embodiments, the first core insert cooling channel 130, the second core insert cooling channel 132 and the third core insert cooling channel 134 can be spaced around the inlet portion 124 in a different manner.

Each of the first core insert cooling channel 130, the second core insert cooling channel 132 and the third core insert cooling channel 134 terminate in the outlet portion 126.

It should be noted that in alternative embodiments of the present invention, the inlet portion 124 and the outlet portion 126 can be reversed. In other words, in alternative non-limiting embodiments of the present invention, the inlet portion 124 can be located within the outlet portion 126.

Figure 3:
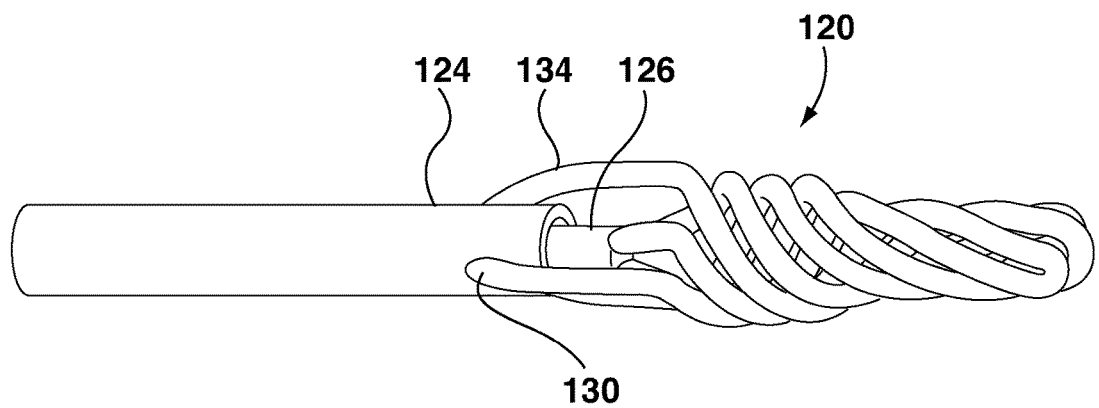
FIG. 3 depicts a cooling circuit of the core insert of FIG. 1, the cooling circuit being implemented in accordance with a non-limiting embodiment of the present technology.

With continued reference to FIG. 2 and with additional reference to FIG. 3 (which depicts schematically the perspective view of the core insert cooling circuit 120), it can be appreciated that each of the first core insert cooling channel 130, the second core insert cooling channel 132 and the third core insert cooling channel 134 are implemented as a respective spiral channel. It can be also appreciated that the respective spirals of the first core insert cooling channel 130, the second core insert cooling channel 132 and the third core insert cooling channel 134 are nested within each other. In other words, it can be said that the first core insert cooling channel 130, the second core insert cooling channel 132 and the third core insert cooling channel 134 are implemented as multiple nested spiral channels. Put another way, each of the first core insert cooling channel 130, the second core insert cooling channel 132 and the third core insert cooling channel 134 defines a helical channel.

As can be appreciated from the depiction of FIG. 3, each of the first core insert cooling channel 130, the second core insert cooling channel 132 and the third core insert cooling channel 134 are fluidly coupled, in parallel, between the inlet portion 124 and the outlet portion 126.

In some embodiments of the present technology, a pitch between the nested spirals of the first core insert cooling channel 130, the second core insert cooling channel 132 and the third core insert cooling channel 134 can be the same. For the purposes of the description to be presented herein below in respect to the nested spirals, the term "pitch" shall mean a distance between neighboring ones of the first core insert cooling channel 130, the second core insert cooling channel 132 and the third core insert cooling channel 134.

Needless to say that in other embodiments of the present technology and is the case in the illustration of FIG. 2 and FIG. 3, the pitch between the nested spirals of the first core insert cooling channel 130, the second core insert cooling channel 132 and the third core insert cooling channel 134 can be varied.

The exact variations of the pitch between the nested spirals of the first core insert cooling channel 130, the second core insert cooling channel 132 and the third core insert cooling channel 134 can be varied by those of skill in the art, based on the specific geometry of the preform being molded and on specific cooling needs for that preform.

As those skilled in the art will appreciate, the wall thickness of a preform is not uniform throughout the length of the preform. One will also appreciate that the cooling rate needs associated with the portions of the preforms with different wall thickness may also be different. Thus, by varying the pitch between the nested spirals of the first core insert cooling channel 130, the second core insert cooling channel 132 and the third core insert cooling channel 134, one may ensure that the heat transfer along a length of the preform is uniform. This can be achieved my matching tighter pitch of the nested spirals of the first core insert cooling channel 130, the second core insert cooling channel 132 and the third core insert cooling channel 134 with the thicker cross-sectional areas of the preform. In other words, varying the pitch between the nested spirals varies the potential heat transfer rate. One can tighten the pitch (which brings the nested spirals closer together) in those regions of the preform where one wants higher heat transfer rate.

Alternatively or additionally, one may vary the cross section of one or more of the first core insert cooling channel 130, the second core insert cooling channel 132 and the third core insert cooling channel 134 to vary the cooling rates. Alternatively or additionally, one may vary a distance between a portion of one or more of the first core insert cooling channel 130, the second core insert cooling channel 132 and the third core insert cooling channel 134 and the core insert molding surface 106 to vary the cooling rates. It should be noted that some or all of these approaches can be combined in order to vary cooling rates.

In the specific example being depicted in FIG. 2 and FIG. 3, the pitch between the nested spirals of the first core insert cooling channel 130, the second core insert cooling channel 132 and the third core insert cooling channel 134 decreases toward the bottom portion of the preform (towards the right of the core insert 102 as viewed in FIG. 2 and FIG. 3) and increases towards the neck finish of the preform (towards the left of the core insert 102 as viewed in FIG. 2 and FIG. 3). This embodiment can be useful for molding those preforms that have a thread region of the preform that cools much slower than the body region due to there being more PET material mass in the neck finish zone (or in other words, the "thread-limited" preforms whereby the neck region is relatively thicker compared to a "standard" preform design).

A specific technical effect that may be attributable to these embodiments of the present technology may include a more uniform reduction in bulk temperature of the preform (due to the non-uniform pitch between the nested spirals of the first core insert cooling channel 130, the second core insert cooling channel 132 and the third core insert cooling channel 134 or alternatively due to the varied distance between the respective one of the first core insert cooling channel 130, the second core insert cooling channel 132 and the third core insert cooling channel 134 and the core molding surface 106 or alternatively due to the varied cross sections of portions of one or more of the first core insert cooling channel 130, the second core insert cooling channel 132 and the third core insert cooling channel 134 and the core molding surface 106) and, therefore, may assist in reducing preform defects associated with the prior art solutions.

One can further appreciate that the plurality of core insert cooling channels 128 is defined by the core insert body 102. Therefore, it can be said that the plurality of core insert channels 128 is fully encapsulated within the core insert body 102, at least in some embodiments of the present technology. In other words, the plurality of core insert cooling channels 128 is defined by and intermeshed within a network of core cooling channel supports 136 (see FIG. 2). The network of core cooling channel supports 136 is a residual portion of the body 102 that defines the plurality of core insert cooling channels 128. Put another way, the material of the core insert body 102 that defines the core insert cooling channels 128 constitutes the network of core cooling channel supports 136. Therefore, it can be said, that the plurality of core insert cooling channels 128 is fully contained within the core insert body 102.

A technical effect attributable at least partial to the embodiments of the present technology includes improved heat transfer between the molded article and the cooling fluid and, thus, increase the rate of heat removal (i.e. comparatively faster cooling). This is at least partially attributable to the provision of network of core cooling channel supports 136, which in a sense, provides support to the core insert molding surface 106. That in turn may allow to make the walls of the core insert body 102 thinner, compared to the prior art designs. That, in turn, may help to minimize distance between the core insert molding surface 106 and the cooling fluid travelling through the plurality of core insert cooling channels 128.

It can also be appreciated from both FIG. 2 and FIG. 3, that the provision of the nested spiral channels (i.e. the plurality of core insert cooling channels 128) allows for creation of a turbulent flow of a cooling fluid through the enclosed plurality of core insert cooling channels 128. One will appreciate that turbulent flow of the cooling fluid leads to a decrease in the thermal boundary layer, which in turn, may lead to improved cooling of the molded article.

One skilled in the art may further appreciate that the design of the plurality of core insert cooling channels 128 may lead to reduced pressure losses of the cooling fluid. The reduced pressure losses may be attributable, at least in part, to the constant cross-sectional area of the plurality of core insert cooling channels 128. A technical effect of embodiments of the present technology, at least partially attributable to reducing pressure losses of the coolant fluid circulating through the plurality of core insert cooling channels 128 may be helpful in reducing the energy requirements of the system. Another technical effect of non-limiting embodiments of the present technology may include ability to design the core insert cooling channels 128 such that there are no abrupt directional changes, which result in lower energy loss.

Figure 4:
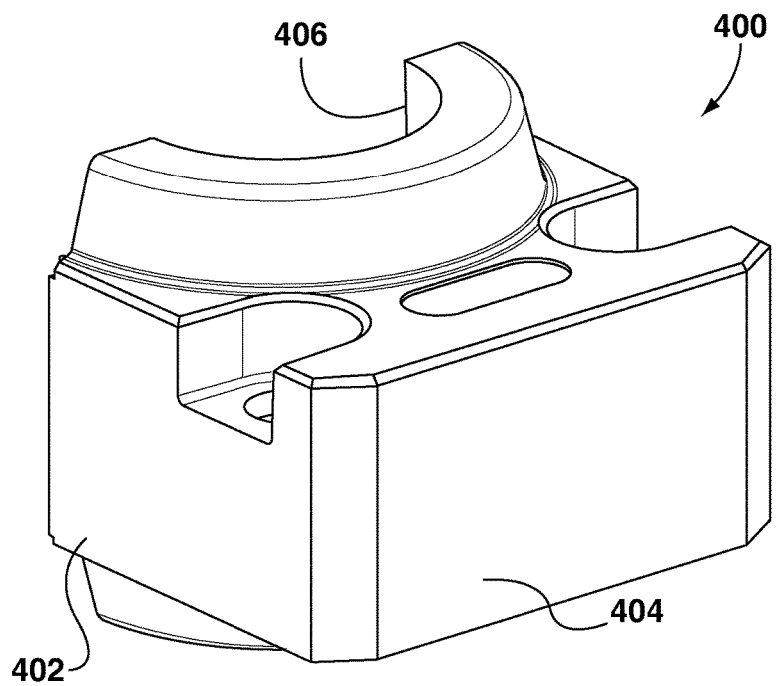
FIG. 4 depicts a perspective view of a neck ring, the neck ring being implemented in accordance with a non-limiting embodiment of the present technology.

With reference to FIG. 4, there is depicted a neck ring 400, the neck ring 400 being implemented in accordance with a non-limiting embodiment of the present technology. The general purpose of the neck ring 400 is to define, in use, a portion of a molding cavity (not depicted) that is used to define the preform. Specifically, the neck ring 400 is configured to define the neck portion of the preform (i.e. a portion that comprises at least some of a thread finish, a support ledge and tamper-evident band). As is known to those of skill in the art, the neck ring 400 typically comes in pair, which complementary pair consists of substantially similar (but not necessarily identical) neck rings 400, which together define the full circumference of the neck finish of the preform (not depicted).

The general construction of the neck ring 400 is known to those of skill in the art and, as such, only a very brief description of the features generally known will be presented herein, while the main focus of the description to be presented herein will be on the specific features of embodiments of the present technology.

To that end, the neck ring 400 comprises a neck ring body 402. The body 402 defines a flange 404, the flange 404 for coupling, in use, the neck ring body 402 to a slide of the mold (not depicted). The neck ring body 402 further comprises a neck ring molding surface 406. The neck ring molding surface 406, in this example, defines an outer skin of the molded article (not depicted) to be molded (namely, the neck finish of the preform to be molded).

The neck ring molding surface 406 is shaped in an inverse relationship to the shape of the molded article (not depicted) to be molded—in other words, the neck ring molding surface 406 is the generally female image of the male image to be defined on the molded article (not depicted) to be molded (for example, of the support ledge to be defined on the preform).

It can be said that the neck ring 400 plays several functions during the appropriate portions of the molding cycle. On the one hand, the neck ring 400 defines a portion of the shape of the molded article, as has been described above. Another function of the neck ring 400 is to assist in stripping the preform off the core insert 100 during the appropriate portions of the molded cycle and, eventually, to allow all the projecting portions of the preform to be released from the neck ring 400 by virtue of transverse separation of the pair of the neck rings 400.

Figure 5:
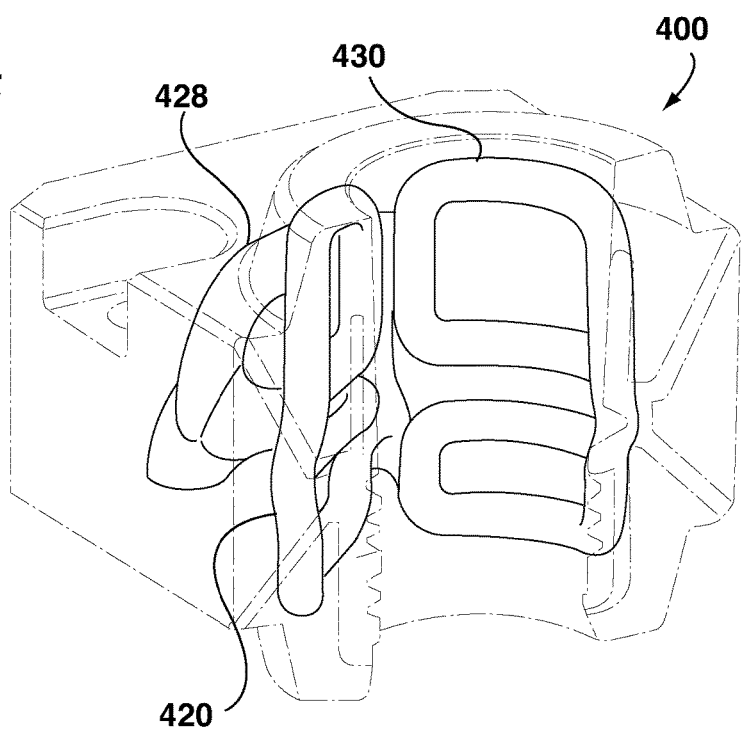
FIG. 5 depicts a partially transparent view of the neck ring of FIG. 4.
Figure 6:
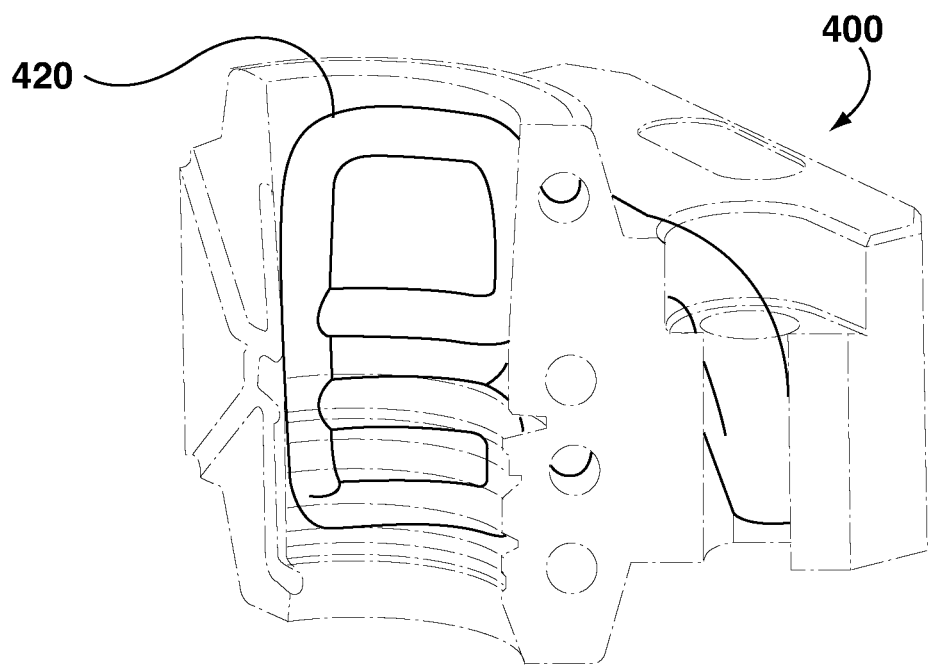
FIG. 6 depicts another partially transparent view of the neck ring of FIG. 4.

Another function of the neck ring 400 is to assist in cooling of the molded article. To that end and with reference to FIG. 5 and FIG. 6 (in which the neck ring 400 is shown partially transparent), the neck ring 400 comprises a neck ring cooling circuit 420. With additional reference to FIG. 7 (in which the neck ring cooling circuit 420 is shown), the neck ring cooling circuit 420 is connected, in use, to a source of a cooling fluid (not depicted) via a neck ring cooling inlet 422 (for receiving fresh cooling fluid) and to a neck ring cooling outlet 426 (for allowing cooling fluid that has absorbed heat from the molded article to be evacuated). It can be said that the neck ring cooling circuit 420 is fully encapsulated within the neck ring body 402, at least in some embodiments of the present technology.

Generally speaking, according to non-limiting embodiments of the present technology, the neck ring cooling circuit 420 comprises a plurality of branch channels that are connected in parallel to the neck ring cooling inlet 422 and the neck ring cooling outlet 426 and at least one of the branch channels includes multiple channel segments connected in parallel therein.

More specifically, in accordance with embodiments of the present technology, the neck ring cooling circuit 420 comprises a first cooling sub-network 428 and a second cooling sub-network 430. With continued reference to FIG. 5 and FIG. 6, as well as with reference to FIG. 7 (in which the neck ring cooling circuit 420 is shown), it can be said that the first cooling sub-network 428 and the second cooling sub-network 430 are fluidly coupled, in parallel, to the neck ring cooling inlet 422 and the neck ring cooling outlet 426. Thus, the first cooling sub-network 428 and the second cooling sub-network 430 are examples of implementation of the above-referenced plurality of branch channels.

Figure 7:
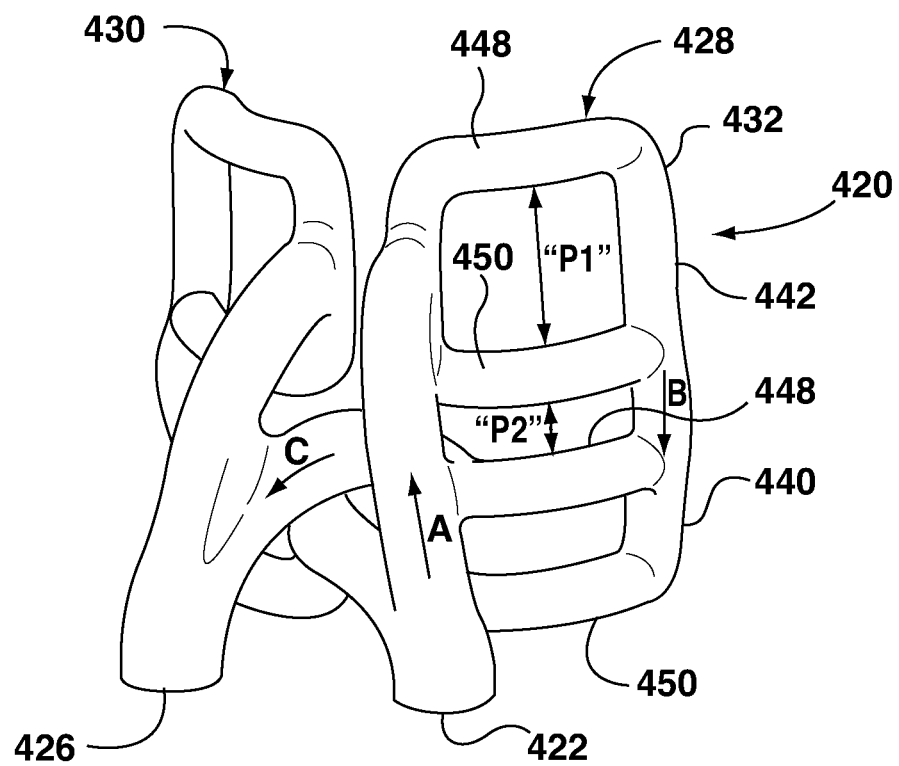
FIG. 7 depicts a cooling circuit of the neck ring of FIG. 4, the cooling circuit being implemented in accordance with a non-limiting embodiment of the present technology.

As is best seen in FIG. 7, the first cooling sub-network 428 and the second cooling sub-network 430 are substantially mirror images of each other. As such, the description below will use the first cooling sub-network 428 for the purposes of the description of structure thereof, which description will apply to the second cooling sub-network 430.

The first cooling sub-network 428 comprises a cooling channel 432. The neck ring cooling channel 432 has a general shape that follows the contours of the neck ring molding surface 406. As such, it can be said that the neck ring cooling channel 423 is implemented as a "conformal cooling" channel, in a sense that if "conforms" to the shape of the neck ring molding surface 406. In the depicted embodiment, the cooling channel 432 comprises two branches—a first cooling network sub-branch 440 and a second cooling network sub-branch 442. The first cooling network sub-branch 440 and the second cooling network sub-branch 442 are fluidly coupled (directly or indirectly) to the neck ring cooling inlet 424 and the neck ring cooling outlet 426 in sequence. More specifically, the cooling fluid enters through the neck ring cooling inlet 422 to the second cooling network sub-branch 442 (arrow A in FIG. 7), then flows through the second cooling network sub-branch 442 to the first cooling network sub-branch 440 (Arrow B in FIG. 7) and then towards the neck ring cooling outlet 426 (Arrow C in FIG. 7).

In the illustrated embodiment, both the first cooling network sub-branch 440 and the second cooling network sub-branch 442 comprise a first sub-sub-branch line 448 and a second sub-sub-branch line 450. The first sub-sub-branch line 448 and the second sub-sub-branch line 450 are fluidly coupled in parallel (indirectly) to the neck ring cooling inlet 424 and the neck ring cooling outlet 426. In other words, as the cooling fluid flows from neck ring cooling inlet 422 to the second cooling network sub-branch 442 (Arrow A), it splits off in parallel into the first sub-sub-branch line 448 and the second sub-sub-branch line 450 of the second cooling network sub-branch 442. In the same manner, as the cooling fluid flows from the second cooling sub-branch 442 towards the first cooling sub-branch 440 (Arrow B), it splits off in parallel into the first sub-sub-branch line 448 and the second sub-sub-branch line 450 of the first cooling network sub-branch 440 and, then eventually, rejoins towards the neck ring cooling outlet 426 (Arrow C).

Thus, first sub-sub-branch line 448 and the second sub-sub-branch line 450 are examples of implementation of the above-references multiple channel segments.

It should be expressly understood that even though within the depicted embodiments both the first cooling network sub-branch 440 and the second cooling network sub-branch 442 are depicted as having the first sub-sub-branch line 448 and the second sub-sub-branch line 450 fluidly coupled in parallel, this needs not be so in every embodiment of the present technology. As such, in alternative embodiments of the present technology, only one of the first cooling network sub-branch 440 and the second cooling network sub-branch 442 may be implemented having the first sub-sub-branch line 448 and the second sub-sub-branch line 450 fluidly coupled in parallel.

It should be also understood that even though the cooling channel 432 is depicted as having two branches, this needs not be so in every embodiment of the present technology. As such, in an alternative embodiment of the present technology, it is contemplated that the cooling channel 432 may include only a single cooling network sub-branch 440, 442. That single cooling network sub-branch 440, 442 may be implemented as having the first sub-sub-branch line 448 and the second sub-sub-branch line 450 fluidly coupled in parallel.

Furthermore, even though the first cooling sub-network 428 and the second cooling sub-network 430 are depicted as being substantially mirror images of each other, this also needs not to be so in every embodiment of the present technology. As such, in alternative embodiments of the present technology, at least one of the first cooling sub-network 428 and the second cooling sub-network 430 may be implemented as having the first cooling network sub-branch 440 and the second cooling network sub-branch 442 that in turn include the first sub-sub-branch line 448 and the second sub-sub-branch line 450 fluidly coupled in parallel.

Furthermore, it should be expressly understood that the exact number of the first sub-sub-branch line 448 and the second sub-sub-branch line 450 is not limited. As such, even though only two have been depicted within the respective one of the first cooling network sub-branch 440 and the second cooling network sub-branch 442, in alternative embodiments of the present technology, additional ones of the first sub-sub-branch line 448 and the second sub-sub-branch line 450 may be provided.

Accordingly and broadly speaking, according to embodiments of the present technology, there can be provided a neck ring 400 that comprises the neck ring body 402 that defines (i) a neck ring molding surface 406 for defining, in a use, a portion of a molding cavity for molding a molded article; and a (ii) a flange 404 for coupling, in use, the neck ring body 402 to a slide of a mold. The neck ring body 402 further includes a neck ring cooling circuit 420 connected, in use, to a source of a cooling fluid via a neck ring cooling inlet 424 and a neck ring cooling outlet 426. The neck ring cooling circuit 420 can be said to have a first cooling sub-network 428 and a second cooling sub-network 430, in use, fluidly coupled in parallel to the neck ring cooling inlet 424 and the neck ring cooling outlet 426. At least one of the first cooling sub-network 428 and the second cooling sub-network 430 includes a cooling network sub-branch 440, 442 having a first sub-sub-branch line 448 and a second sub-sub-branch line 450 fluidly coupled in parallel.

As can be appreciated from FIG. 7, a pitch between (i) the first sub-sub-branch line 448 and the second sub-sub-branch line 450 within a given one of the first cooling network sub-branch 440 and the second cooling network sub-branch 442 (such as, for example, a distance "P1" shown in FIG. 7) and (ii) the neighboring ones of the first sub-sub-branch line 448 of the first cooling network sub-branch 440 and the second sub-sub-branch 450 of the second cooling network sub-branch 442 (such as, for example, a distance "P2" shown in FIG. 7) is different. The exact differences in the pitch will depend on the design of and the cooling rate needs of the particular neck finish of the preform being molded. Similarly, the pitch between (i) the first sub-sub-branch line 448 and the second sub-sub-branch line 450 within the first cooling network sub-branch 440 and (ii) the first sub-sub-branch line 448 and the second sub-sub-branch line 450 within the second cooling network sub-branch 442 also can be different, depending on the cooling rate needs of the particular neck finish of the preform to be molded. Alternatively or additionally, one may vary the cross section of a portion of the cooling channel 432. Alternatively or additionally, one may vary a distance between a portion of the cooling channel 432 and the neck ring molding surface 406 to vary the cooling rates. It should be noted that some or all of these approaches can be combined in order to vary cooling rates.

A specific technical effect that may be attributable to these embodiments of the present technology may include a more uniform reduction in bulk temperature of the neck region of the preform (due to the ability to vary the profile of the neck ring cooling circuit 420 along the neck ring molding surface 406). As is appreciated by those skilled in the art, the distribution of the molding material within the neck finish of the preform is non-uniform. Varying the pitch between the various sub-sub-branch line 448 and second sub-sub-branch line 450 allows creating different rate of cooling within elements being cooled by the neck ring 400.

Another technical effect of embodiments of the present technology may be attributable to the fact that the various components of the neck ring cooling circuit 420 are fluidly coupled in parallel. That allows to reduce the distance that the cooling fluid particles have to travel within the neck ring cooling circuit 420 and, therefore, allow for less of a temperature differential in the cooling fluid temperature as it travels through the neck ring cooling circuit 420. That, in turn, allows for more uniform cooling of the preform.

Figure 8:
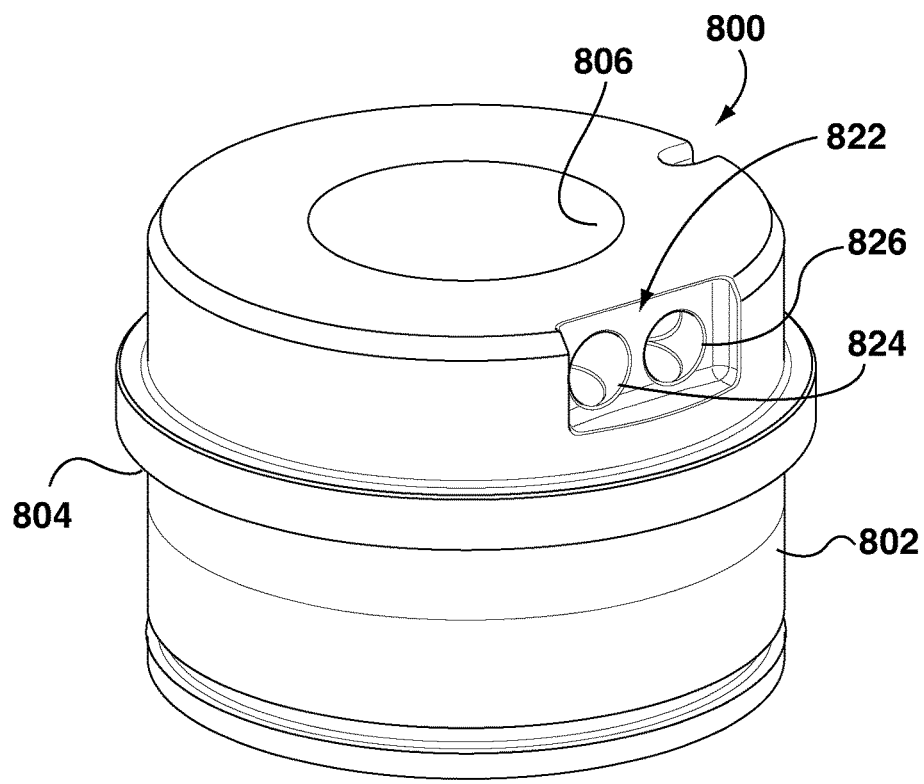
FIG. 8 depicts a perspective view of a cavity insert, the cavity insert being implemented in accordance with a non-limiting embodiment of the present technology.

With reference to FIG. 8, there is depicted a cavity insert 800, the cavity insert 800 being implemented in accordance with a non-limiting embodiment of the present technology. The general purpose of the cavity insert 800 is to define, in use, a portion of a molding cavity (not depicted) that is used to define a molded article (not depicted), which in this case comprises a preform, which preform is subsequently blow molded into a final shaped container (such as a bottle or the like). The general construction of the cavity insert 800 is known to those of skill in the art and, as such, only a very brief description of the generally known features will be presented herein, while the main focus will be on the specific features of embodiments of the present technology.

To that end, the cavity insert 800 comprises a cavity insert body 802. In use, the cavity insert body 802 is positioned within a cavity plate (not depicted). To that end, the cavity insert body 802 defines a connecting interface 804, the connecting interface 804 for coupling, in use, the cavity insert body 802 to the cavity plate of the mold (not depicted). The cavity insert body 802 further defines a cavity insert molding surface 806. The cavity insert molding surface 806, in this example, defines an outer skin of the molded article (not depicted) to be molded. The cavity insert molding surface 806 is shaped in an inverse relationship to the shape of the molded article (not depicted) to be molded—in other words, the cavity insert molding surface 806 is the female image of the male image to be defined on the molded article (not depicted) to be molded.

It can be said that the cavity insert 800 plays at least two functions during the appropriate portions of the molding cycle. On the one hand, the cavity insert 800 defines a portion of the shape of the molded article, as has been described above. Another function is to assist in cooling of the molded article. To that end and with reference to FIG. 9, the cavity insert 800 comprises a cavity insert cooling circuit 820.

The cavity insert cooling circuit 820 comprises a cavity cooling inlet 822. Within the depicted embodiment of the present technology, the cavity cooling inlet 822 comprises a first cavity cooling inlet portion 824 and a second cavity cooling inlet portion 826, the function of which will be described herein below. The cavity cooling inlet 822 is for receiving fresh cooling fluid.

Figure 9:
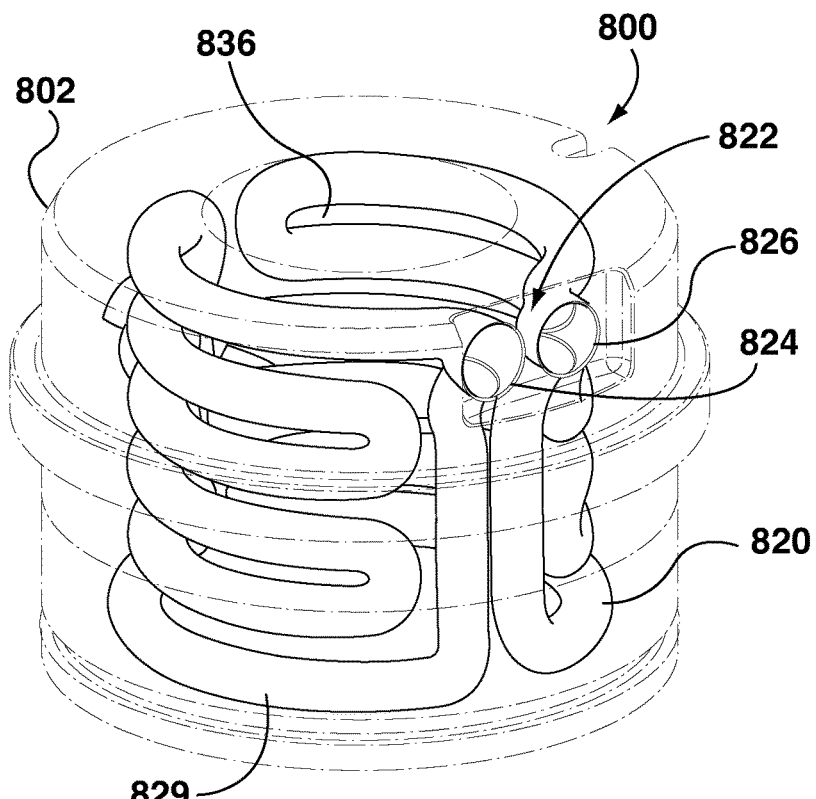
FIG. 9 depicts a partially transparent view of the cavity insert of FIG. 8.
Figure 10:
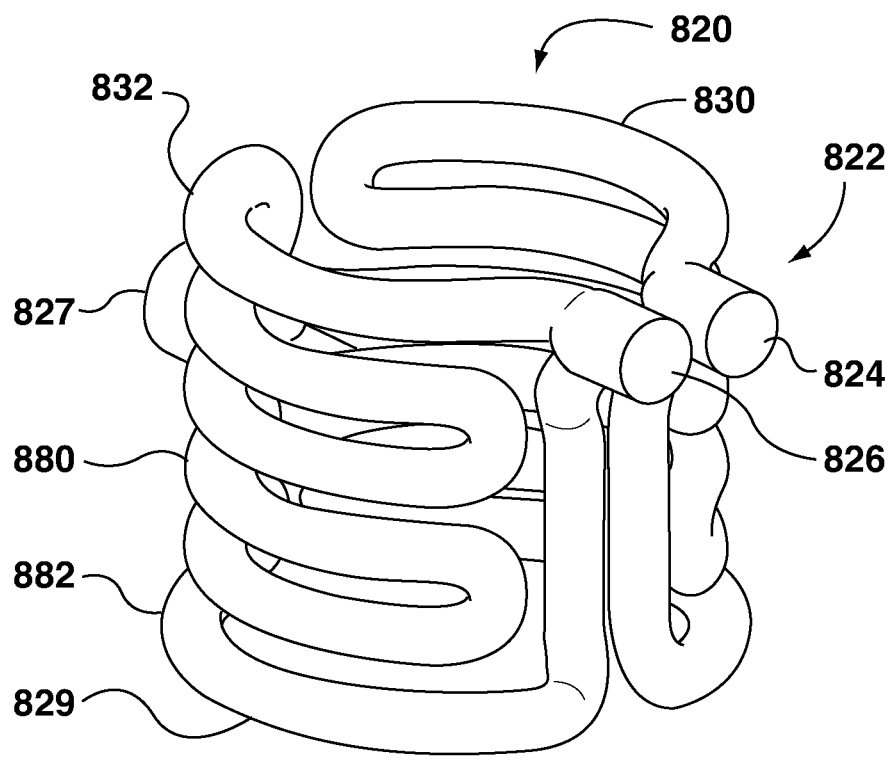
FIG. 10 depicts a cooling circuit of the cavity insert of FIG. 8, the cooling circuit being implemented in accordance with a non-limiting embodiment of the present technology.

With reference to FIG. 10, which depicts a schematic perspective view of the cavity insert cooling circuit 820, the cavity insert cooling circuit 820 further comprises a cavity cooling outlet 827 for allowing cooling fluid that has absorbed heat from the molded article to be evacuated. It is briefly noted (and as will be described in further detail herein below), in the embodiments of the instant technology depicted and described with reference to FIG. 9 and FIG. 10, there are two instances of cooling fluid inlets (namely, the first cavity cooling inlet portion 824 and the second cavity cooling inlet portion 826) fluidly terminating in a single instance of the cooling fluid outlet (namely, the cavity cooling outlet 826). The sizing of the conduits within the cavity insert cooling circuit 820 is determined based on real estate availability within the cavity insert body 802 and the cooling rate requirements.

Needless to say, the placement of the cavity cooling inlet 822 and the cavity cooling outlet 827 may be reversed. This is depicted with reference to FIG. 11, which depicts another embodiment of a cavity insert cooling circuit 820'. Within the embodiment of the present technology depicted with reference to FIG. 11, the cavity insert cooling circuit 802' comprises a cavity cooling inlet 822' and a cavity cooling outlet 827'. Within this embodiment of the present technology, the cavity cooling outlet 827' comprises a first cavity cooling outlet portion 824' and a second cavity cooling outlet portion 827'.

Figure 11:
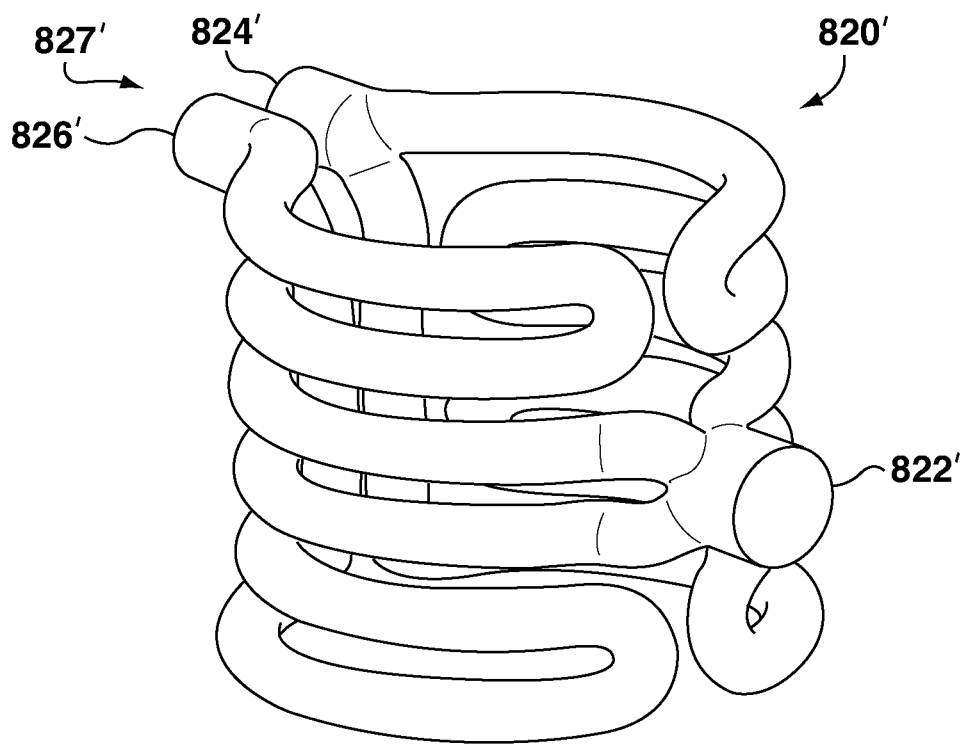
FIG. 11 depicts a cooling circuit of the cavity insert of FIG. 8, the cooling circuit being implemented in accordance with another non-limiting embodiment of the present technology.

Returning to the description of FIGS. 9 and 10 (but appreciating that the following description will apply to the embodiments depicted in FIG. 11 as well), the cavity insert cooling circuit 820 further comprises a plurality of cavity insert cooling channels 829. Within the specific embodiment being depicted the plurality of cavity insert cooling channels 829 comprises two cooling lines: a first cavity insert cooling channel 830 and a second cavity insert cooling channel 832. It should be expressly understand that the exact number of cavity cooling channels 830, 832 within the plurality of cavity insert cooling channels 829 is not particularly limited to the four parallel lines depicted within the illustrated embodiment. As such, in alternative non-limiting embodiments of the present technology, the plurality of cavity insert cooling channels 128 may comprise more than two lines.

Each of the first cavity insert cooling channel 830 and the second cavity insert cooling channel 832 originate from the inlet portion 822 (or, more precisely, from a respective one of the first cavity cooling inlet portion 824 and the second cavity cooling inlet portion 826). Each of the first cavity insert cooling channel 830 and the second cavity insert cooling channel 832 terminate in the cavity cooling outlet 827.

It may be further appreciated that each of the first cavity insert cooling channel 830 and the second cavity insert cooling channel 832 are fluidly coupled, in parallel, between the cavity cooling inlet 824 and the cavity cooling outlet 827.

Within embodiments of the present technology, each of the first cavity insert cooling channel 830 and the second cavity insert cooling channel 832 comprises respective ones of a first cavity insert cooling sub-network 880 and a second cavity insert cooling sub-network 882 (only one instance in association with the second cavity insert cooling channel 832 is actually specifically numbered). Within the respective one of the first cavity insert cooling channel 830 and the second cavity insert cooling channel 832, the first cavity insert cooling sub-network 880 and the second cavity insert cooling sub-network 882 are fluidly coupled, in parallel, directly or indirectly, between the cavity cooling inlet 824 and the cavity cooling outlet 827.

One can further appreciate that the plurality of cavity insert cooling channels 829 is defined by and within the cavity insert body 802. It can be said that the plurality of cavity insert cooling channels 829 is fully encapsulated within the cavity insert body 802, at least in some embodiments of the present technology. Put another way, the plurality of cavity insert cooling channels 829 is defined and intermeshed with a network of cavity cooling channel supports 836 (see FIG. 9). The network of cavity cooling channel supports 836 is a residual portion of the cavity insert body 802 that defines the plurality of cavity insert cooling channels 829.

Accordingly and broadly speaking, what has been described herein above is the cavity insert 800 that includes the cavity insert body 802 that defines: (i) the cavity insert molding surface 806 for defining, in a use, a portion of a molding cavity for molding a molded article; (ii) the connecting interface 804 for coupling, in use, the cavity insert body 802 to the cavity plate (not depicted) and (iii) the cavity insert cooling circuit 820 having the plurality of cavity insert cooling channels 829, the plurality of cavity insert cooling channels 829 being coupled in parallel to a source of cooling fluid via the cavity cooling inlet 824 and the cavity cooling outlet 827.

It is noted that the plurality of cavity insert cooling channels 829 has a general shape that follows the contours of the cavity insert molding surface 806. As such, it can be said that the plurality of cavity insert cooling channels 829 is implemented as a "conformal cooling" channel, in a sense that if "conforms" to the shape of the cavity insert molding surface 806.

It should be understood that even though both the first cavity insert cooling channel 830 and the second cavity insert cooling channel 832 have been described as including respective ones of a first cavity insert cooling sub-network 880 and a second cavity insert cooling sub-network 882, this needs not be so in every embodiment of the present technology. The first cavity insert cooling channel 830 and the second cavity insert cooling channel 832 do not have to be minor images of each other and can be implemented differently comparable therebetween.

Furthermore, even though the respective ones of the first cavity insert cooling channel 830 and the second cavity insert cooling channel 832 have been depicted as both having the first cavity insert cooling sub-network 880 and the second cavity insert cooling sub-network 882 fluidly coupled, in parallel, directly or indirectly, between the cavity cooling inlet 824 and the cavity cooling outlet 827, this needs not be so in every embodiment.

As such, in alternative embodiments, only one of the first cavity insert cooling channel 830 and the second cavity insert cooling channel 832 may include the first cavity insert cooling sub-network 880 and the second cavity insert cooling sub-network 882 fluidly coupled, in parallel, directly or indirectly, between the cavity cooling inlet 824 and the cavity cooling outlet 827.

Furthermore, the exact number and shape of the first cavity insert cooling sub-network 880 and the second cavity insert cooling sub-network 882 may be varied from what has been depicted in the illustrations of FIG. 9, FIG. 10 and FIG. 11.

A technical effect of embodiments of the present invention may include increased "wetted area" of the plurality of cavity insert cooling channels 829. Another technical effect of embodiments of the present invention may include a constant distance between various portions of the plurality of cavity insert cooling channels 829 and the respective portions of the preform being cooled. This may lead, in some embodiments, to a higher rate of heat removal and, potentially, to improved preform quality and the increased throughout of the system (i.e. reduced cycle time).

Furthermore, provision of the network of cavity cooling channel supports 836 may allow to minimize the distance between the plurality of cavity insert cooling channels 829 and the cavity insert molding surface 806. This in turn may have another technical effect of improving the heat removal rate. Furthermore, the network of cavity cooling channel supports 836 may in themself assist in removing heat away from the cavity insert molding surface 806 and "placing" the heat in the path of the cooling fluid circulating through the plurality of cavity insert cooling channels 829. It should be noted that alternatively or additionally, one may vary the cross section of a portion of the cavity insert cooling circuit 820. Alternatively or additionally, one may vary a distance between a portion of the cavity insert cooling circuit 820 and the cavity insert molding surface 806 to vary the cooling rates. It should be noted that some or all of these approaches can be combined in order to vary cooling rates.

Figure 12:
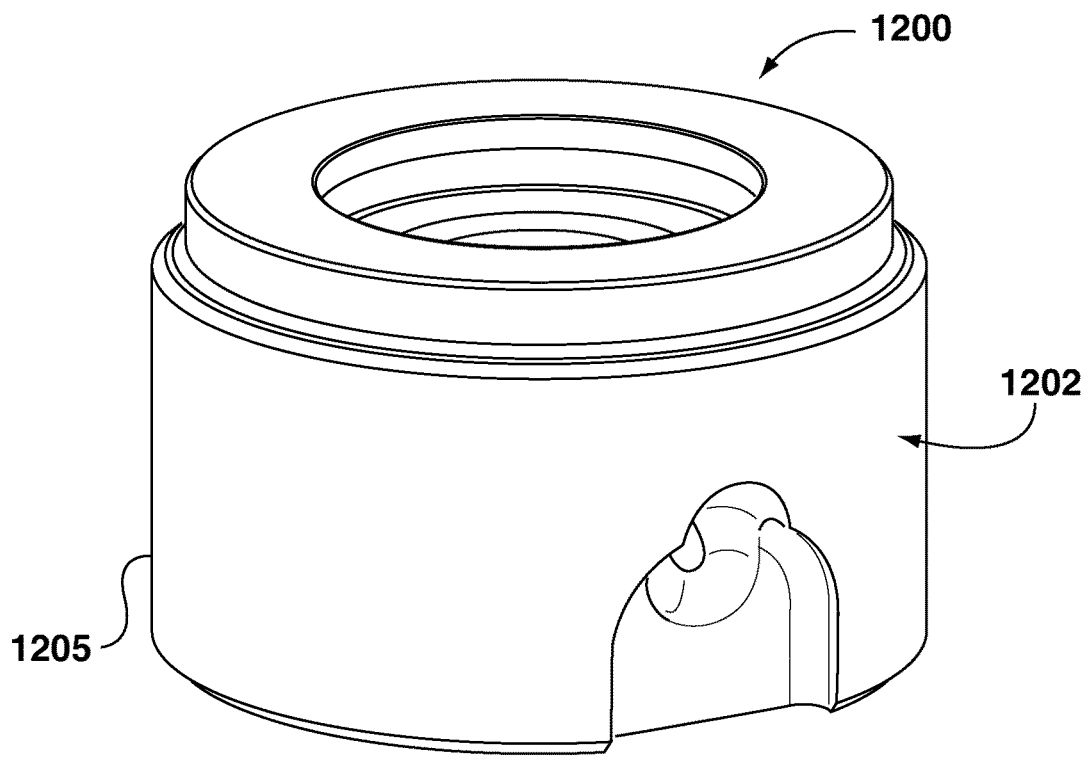
FIG. 12 depicts a perspective view of a gate insert, the gate insert being implemented in accordance with a non-limiting embodiment of the present technology.

With reference to FIG. 12, there is depicted a gate insert 1200, the gate insert 1200 being implemented in accordance with a non-limiting embodiment of the present technology. The general purpose of the gate insert 1200 is to define, in use, a portion of a molding cavity (not depicted) that is used to define a molded article (not depicted), which in this case comprises a preform, which preform is subsequently blow molded into a final shaped container (such as a bottle or the like). The general construction of the gate insert 1200 is known to those of skill in the art and, as such, only a very brief description of the generally known features will be presented herein, while the main focus will be on the specific features of embodiments of the present technology.

To that end, the gate insert 1200 comprises a gate insert body 1202. In use, the gate insert body 1202 is positioned within a cavity plate of the mold (not depicted). To that end, the gate insert body 1202 defines a gate insert connecting interface 1205, the gate insert connecting interface 1205 for coupling, in use, the gate insert body 1202 to the cavity plate (not depicted). It is noted that in some non-limiting embodiments of the present technology, the gate insert body 1202 may interface with portions of multiple plates—such as the cavity plate, the hot runner manifold plate, etc. (the plates not being depicted in the drawings).

Figure 13:
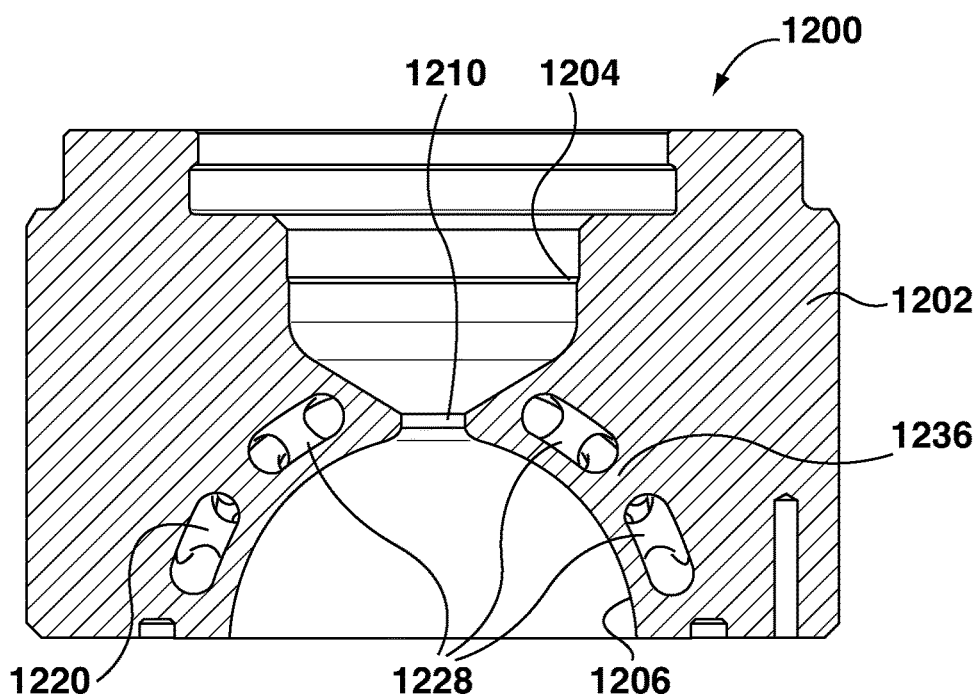
FIG. 13 depicts a sectional view of the gate insert of FIG. 12.

With additional reference to FIG. 13, which depicts a cross section of the gate insert 1200 taken along an operational axis thereof, the gate insert body 1202 comprises a nozzle receptacle 1204. The nozzle receptacle 1204 is configured to interface, in use, with a hot runner nozzle (not depicted) for accepting a stream of molding material from the hot runner (not depicted). The gate insert body 1202 further includes a gate insert molding surface 1206. The gate insert molding surface 1206, in this example, defines an outer skin of the molded article (not depicted) to be molded. The gate insert molding surface 1206 is shaped in an inverse relationship to the shape of the molded article (not depicted) to be molded—in other words, the gate insert molding surface 1206 is the female image of the male image to be defined on the molded article (not depicted) to be molded.

The gate insert body 1202 further defines a gate 1210. The purpose of the gate 1210 is to provide a path of travel for the molding material between the hot runner nozzle (not depicted) accepted within the nozzle receptacle 1288 and the molding cavity (nor depicted) defined in part by the gate insert molding surface 1206.

It can be said that the gate insert 1200 plays at least two functions during the appropriate portions of the molding cycle. On the one hand, the gate insert 1200 defines a portion of the shape of the molded article, as has been described above. Another function is to assist in cooling of the molded article. To that end and with additional reference to FIG. 14 (which depicts the gate insert 1200 in a partially transparent view), the gate insert 1200 comprises a gate insert cooling circuit 1220.

The gate insert cooling circuit 1220 comprises a gate cooling inlet portion 1224 and a gate cooling outlet portion 1226. The gate cooling inlet portion 1224 is for receiving fresh cooling fluid and the gate cooling outlet portion 1226 is for allowing cooling fluid that has absorbed heat from the molded article to be evacuated. Needless to say, the placement of the gate cooling inlet portion 1224 and the gate cooling outlet portion 1226 may be reversed.

The gate insert cooling circuit 1220 further comprises a plurality of gate insert cooling channels 1228. The plurality of gate insert cooling channels 1228 has a general shape that follows the contours of the gate insert molding surface 1206. As such, it can be said that the plurality of gate insert cooling channels 1228 is implemented as a "conformal cooling" channel, in a sense that it "conforms" to the shape of the gate insert molding surface 1206.

One can further appreciate that the plurality of gate insert cooling channels 1228 is defined by the gate insert body 1202. Therefore, it can be said that the plurality of gate insert cooling channels 1228 is fully encapsulated within the gate insert body 1202, at least in some embodiments of the present technology. In other words, the plurality of gate insert cooling channels 1228 is defined and intermeshed with a network of gate cooling channel supports 1236. The network of gate cooling channel supports 1236 is a residual portion of the gate body 1202 that defines the plurality of gate insert cooling channels 1228 therebetween.

Figure 14:
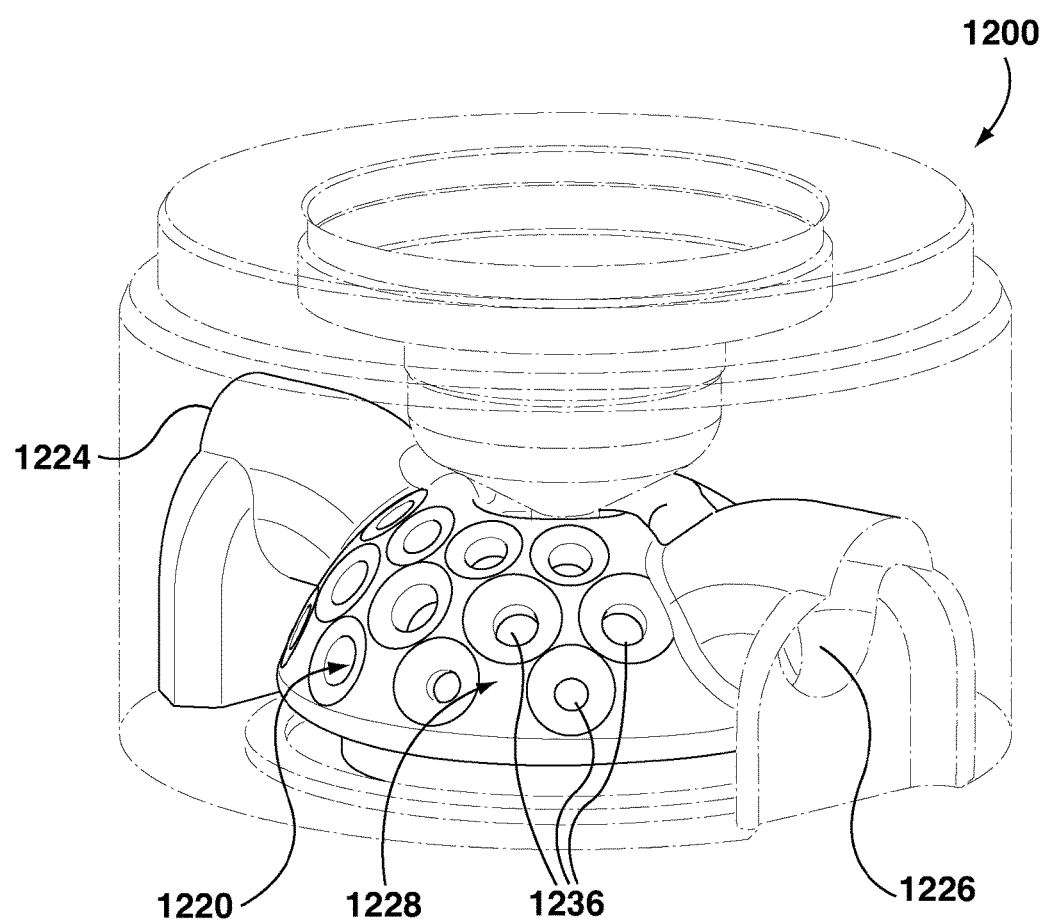
FIG. 14 depicts another partially transparent view of the gate insert of FIG. 12.

As can be seen from the depiction in FIG. 14, the network of gate channel supports 1236 (and hence the plurality of gate insert cooling channels 1228) is equally spaced along the surface of the gate insert molding surface 1206. In other words, the structural support that the network of gate cooling channels supports 1236 provides that the "conformal" plurality of gate insert cooling channels 1228 is evenly distributed along the plurality of gate insert cooling channels 1228.

Alternatively or additionally, one may vary the cross section of a portion of the plurality of gate insert cooling channels 1228. Alternatively or additionally, one may vary a distance between a portion of the plurality of gate insert cooling channels 1228 and the gate insert molding surface 1206 to vary the cooling rates. It should be noted that some or all of these approaches can be combined in order to vary cooling rates. It is noted that some or all of the plurality of gate insert cooling channels 1228 can be fluidly coupled, in parallel, between the gate cooling inlet portion 1224 and the gate cooling outlet portion 1226. Alternatively, some or all of the plurality of gate insert cooling channels 1228 can be fluidly coupled, in sequence, between the gate cooling inlet portion 1224 and the gate cooling outlet portion 1226. In further alternative non-limiting embodiments of the present technology, some of the plurality of gate insert cooling channels 1228 can be fluidly coupled, in sequence, between the gate cooling inlet portion 1224 and the gate cooling outlet portion 1226; while the others of the plurality of gate insert cooling channels 1228 can be fluidly coupled, in parallel, between the gate cooling inlet portion 1224 and the gate cooling outlet portion 1226.

A technical effect of embodiments of the present invention may include increased "wetted area" of the plurality of gate insert cooling channels 1228. Another technical effect of embodiments of the present invention may include a constant distance between various portions of the plurality of gate insert cooling channels 1228 and the respective portions of the preform being cooled. This may lead, in some embodiments, to a higher rate of heat removal and, potentially, to improved preform quality and the increased throughout of the system (i.e. reduced cycle time).

Furthermore, provision of the network of gate insert cooling channel supports 1236 provides additional support to the gate insert molding surface 1206, which may allow to make the wall of the gate insert body 1204 thinner. That in turn may allow to minimize the distance between the plurality of gate insert cooling channels 1228 and the gate insert molding surface 1206. This in turn may have another technical effect of improving the heat removal rate. Furthermore, the network of gate insert cooling channel supports 1236 may in themself assist in removing heat away from the gate insert molding surface 1206 and "placing" the heat in the path of the cooling fluid circulating through the plurality of gate insert cooling channels 1228.

Additionally or alternatively, provision of the network of gate insert cooling channel supports 1236 allows for creation of a turbulent flow of a cooling fluid through the enclosed plurality of gate insert cooling channels 1228. One will appreciate that turbulent flow of the cooling fluid leads to a decrease in the thermal boundary layer, which in turn, may lead to improved cooling of the molded article. Therefore, the network of gate insert cooling channel supports 1236 can be thought of as a turbulence inducing structure provided in the "conformal" plurality of gate insert cooling channels 1228.

In some embodiments of the present invention, some of the cooling channels described herein (such as the plurality of core insert cooling channels 128, the neck ring cooling circuit 420, plurality of cavity insert cooling channels 829, plurality of gate insert cooling channels 1228) can be defined by using 3D printing techniques and other such methods of free form fabrication. An example of such 3D printing technique is a process called direct metal laser sintering (DMLS). An example of such technology is available from EOS of Robert-Stirling-Ring 1, 82152 Krailling, Germany.

Generally speaking and not as a limitation, the DMLS process involves use of a 3D CAD model, which is then used the DMLS machine "builds" the part. The DMLS machine uses a high-powered optic laser. Inside a build chamber area, there is a material dispensing platform and a build platform along with a re-coater blade used to move new powder over the build platform. The DMLS technology fuses metal powder into a solid part by melting it locally using the focused laser beam. Parts are built up additively layer by layer, typically using layers of a certain, pre-defined thickness. The DMLS process may be used to form the entire part of the mold stack component, or other mold component such as a nozzle or manifold of a melt distributor, or only a portion thereof In the latter case, the DMLS process may be used to form the selected portion of the mold component onto a base of the mold component, which base is produced by more conventionally means (e.g. machined). A technical effect of the foregoing may include cost saving (less sintered material and/or lower building time). Therefore, it can be said that in accordance with embodiments of the present technology, there is a provided a method of manufacturing a mold component using a hybrid manufacturing method. The hybrid manufacturing method includes manufacturing a portion of the mold component using a non-DMLS process (for example, by means of machining or other known methods) and manufacturing another portion of the mold component using DMLS process. In some implementations, the portions defined by the DMLS process include but are not limited to: the plurality of core insert cooling channels 128, the neck ring cooling circuit 420, plurality of cavity insert cooling channels 829, plurality of gate insert cooling channels 1228. The mold can include one or more of: the core insert 100, the neck ring insert 400, the cavity insert 800 and the gate insert 1200, or a mold component of a melt distributor (not shown).

It should be expressly understood that the various cooling channel described herein can be produced by using any other known methods and are not limited to the use of DMLS technology, specifically, or 3D printing in general.

According to another non-limiting embodiment of the present technology, there is provided a member of a mold stack. The member of the mold stack can be implemented as the above described core insert 102 or the cavity insert 802.

To that end, the member of the mold stack comprises a member body 102, 802. The member body 102, 802 defines a member molding surface 106, 806 for defining, in a use, a portion of a molding cavity for molding a molded article; and a member connecting interface 104, 804 for coupling, in use, the member body 102, 802 to a mold plate (such as the core plate or the cavity plate, both not depicted). The member body 102, 802 further defines a member cooling circuit 120, 820 having a plurality of member cooling channels 128, 829, the plurality of member cooling channels 128, 829 being coupled in parallel to a source of cooling fluid, the member cooling circuit being 120, 820 being fully encapsulated within the member body.

According to yet another non-limiting embodiment of the present technology, there is provided mold insert stack, the mold stack insert comprising at least two of the conformal cooling core insert 102, the conformal cooling neck ring insert 400, the conformal cooling cavity insert 800 and the conformal cooling gate insert 1200.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A member of a mold stack (100, 800), the member comprising:
   a member body (102, 802) defining:
   a member molding surface (106, 806) for defining, in a use, a portion of a molding cavity for molding a molded article;
   a member cooling circuit (120, 820) having a plurality of member cooling channels (128, 829), the plurality of member cooling channels (128, 829) being coupled in parallel to a source of cooling fluid, the member cooling circuit (120, 820) being fully encapsulated within the member body (102, 802).

2. The member of a mold stack (100, 800) of claim 1, the member being implemented as a core insert (100).

3. The member of a mold stack (100, 800) of claim 1, the member being implemented as a cavity insert (800).

4. The member of a mold stack (100, 800) of claim 1, wherein the plurality of member cooling channels (128, 829) has been defined by direct metal laser sintering (DMLS).

5. The member of a mold stack (100, 800) of claim 1, wherein the plurality of member cooling channels (128, 829) is defined by and intermeshed between a network of member cooling channel supports (136, 836).

6. The member of a mold stack (100, 800) of claim 1, wherein the network of member cooling channel supports (136, 836) is instrumental in drawing some heat away from the member molding surface (106, 806).

* * * * *